United States Patent
Yamaguchi et al.

(10) Patent No.: US 9,030,500 B2
(45) Date of Patent: May 12, 2015

(54) OBJECT SHARING SYSTEM AND NON-TRANSITORY COMPUTER READABLE MEDIUM STORING OBJECT INPUT ASSISTANCE PROGRAM

(71) Applicant: Konica Minolta, Inc., Chiyoda-ku (JP)

(72) Inventors: Yasuhiko Yamaguchi, Hino (JP); Kenta Hosaka, Sagamihara (JP); Yu Iritani, Machida (JP); Yoko Oehara, Machida (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 202 days.

(21) Appl. No.: 13/910,162

(22) Filed: Jun. 5, 2013

(65) Prior Publication Data
US 2013/0328938 A1 Dec. 12, 2013

(30) Foreign Application Priority Data
Jun. 12, 2012 (JP) .................................. 2012-133290

(51) Int. Cl.
*G06F 3/0488* (2013.01)
(52) U.S. Cl.
CPC ........ *G06F 3/04883* (2013.01); *G06K 2209/01* (2013.01)
(58) Field of Classification Search
None
See application file for complete search history.

(56) References Cited

FOREIGN PATENT DOCUMENTS

| JP | 8-7034 A | 1/1996 |
| JP | 2001-357355 A | 12/2001 |
| JP | 2002-149615 A | 5/2002 |
| JP | 2013-246420 A | 12/2013 |

OTHER PUBLICATIONS

Office Action (Notification of Reasons for Refusal) issued on Jul. 11, 2014, by the Japan Patent Office in corresponding Japanese Patent Application No. 2012-133290, and an English Translation of the Office Action. (6 pages).

*Primary Examiner* — David H Chu
(74) *Attorney, Agent, or Firm* — Buchanan Ingersoll & Rooney PC

(57) ABSTRACT

An object sharing system includes a common terminal and a personal terminal. The common terminal includes a common screen for displaying an object handwritten in the personal terminal, and a control section configured to define a reference size and transmit the reference size to the personal terminal. The personal terminal includes a personal screen including a touch panel, and a control section configured to perform processes of determining a guide size based on the reference size, and displaying a guide of the determined size on the personal screen, and processes of calculating a display size on the common screen of an object which has been handwritten on the personal screen, and transmitting the handwritten object and the display size to the common terminal. Further, the control section of the common terminal is further configured to make the common screen display the handwritten object of the display size.

12 Claims, 14 Drawing Sheets

FIG. 4

| SIZE DATA | CHARACTER (CONVERTED WITH OCR) | SIZE DATA OF MANAGED OBJECTS |
|---|---|---|
| | IMAGE | " |
| | CHARACTER HISTORY | " |
| | IMAGE HISTORY | " |
| | INITIAL VALUE FOR CHARACTER | " |
| | INITIAL VALUE FOR IMAGE | " |
| USED-CHARACTER DATA | NUMBER OF CHARACTERS, POINT SIZES (STRUCTURE) | DATA FOR CALCULATING CHARACTER SIZE |
| USED-IMAGE DATA | NUMBER OF IMAGES, SIZES (STRUCTURE) | DATA FOR CALCULATING IMAGE SIZE |
| RESOLUTION (SYSTEM DATA) | HORIZONTAL DIRECTION | DEFINED BY DISPLAY HARDWARE |
| | VERTICAL DIRECTION | " |
| SCREEN SIZE (SYSTEM DATA) | HORIZONTAL DIRECTION | " |
| | VERTICAL DIRECTION | " |
| DISPLAY DATA | START COORDINATES OF CHARACTERS (X,Y AXES) | DATA DISPLAYED ON COMMON SCREEN |
| | CHARACTER SIZE | " |
| | CONTENT OF CHARACTERS (POINTER) | " |
| | START COORDINATES OF IMAGE (X, Y AXES) | " |
| | IMAGE SIZE | " |
| | CONTENT OF IMAGE (BITMAP) | " |
| SIZE DATA FOR TRANSMISSION | CHARACTER | DATA TO BE TRANSMITTED TO REMOTE TOOL |
| | IMAGE | " |
| RECEIVED SIZE DATA | CHARACTER | SCALE FACTOR DATA RECEIVED FROM REMOTE TOOL |
| | IMAGE | " |
| POINTED-COORDINATE DATA | START COORDINATES (X AXIS, Y AXIS) | DATA POINTED BY REMOTE TOOL |
| | SIZES (HORIZONTAL AND VERTICAL DIRECTIONS) | " |
| | CHARACTER | POINTED DATA TO BE TRANSMITTED TO REMOTE TOOL |
| | IMAGE | " |

FIG. 5

| RECEIVED SIZE DATA | CHARACTER | | DATA RECEIVED FROM COMMON TERMINAL |
|---|---|---|---|
| | IMAGE | | " |
| SIZE DATA FOR TRANSMISSION | CHARACTER | | SCALE FACTOR DATA TO BE TRANSMITTED TO COMMON TERMINAL |
| | IMAGE | | " |
| CHARACTER GUIDE SIZE | HORIZONTAL DIRECTION | | SIZE OF GUIDE TO BE DISPLAYED IN REMOTE TOOL |
| | VERTICAL DIRECTION | | " |
| IMAGE GUIDE SIZE | HORIZONTAL DIRECTION | | " |
| | VERTICAL DIRECTION | | " |
| HISTORY DATA | CHARACTER HISTORY | | HISTORY OF GUIDES DISPLAYED IN REMOTE TOOL |
| | IMAGE HISTORY | | " |
| | INITIAL VALUE FOR CHARACTER | | " |
| | INITIAL VALUE FOR IMAGE | | " |
| DISPLAY DATA | START COORDINATES OF CHARACTERS (X,Y AXES) | | DATA DISPLAYED IN REMOTE TOOL |
| | CHARACTER SIZE | | " |
| | CONTENT OF CHARACTERS (POINTER) | | " |
| | START COORDINATES OF IMAGE (X,Y AXES) | | " |
| | IMAGE SIZE | | " |
| | CONTENT OF IMAGE (BITMAP) | | " |
| RESOLUTION (SYSTEM DATA) | HORIZONTAL DIRECTION | | DEFINED BY DISPLAY HARDWARE |
| | VERTICAL DIRECTION | | " |
| SCREEN SIZE (SYSTEM DATA) | HORIZONTAL DIRECTION | | " |
| | VERTICAL DIRECTION | | " |

FIG. 6
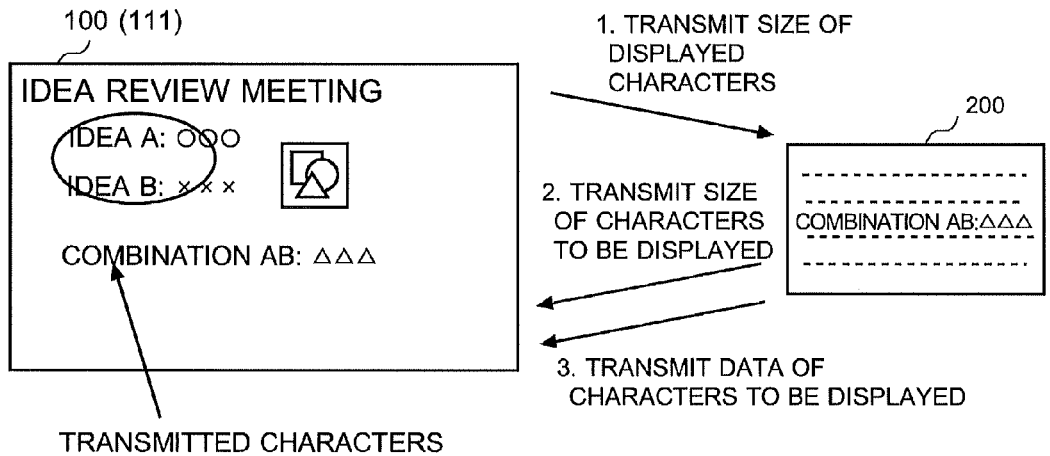
FIG. 7A
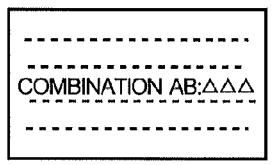
FIG. 7B
FIG. 7C
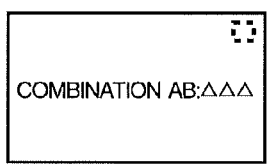
FIG. 7D
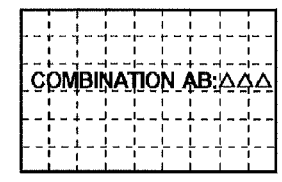
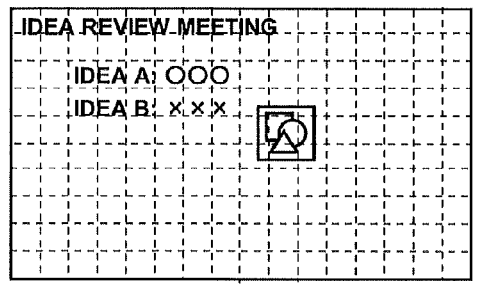

OBJECT SHARING SYSTEM AND NON-TRANSITORY COMPUTER READABLE MEDIUM STORING OBJECT INPUT ASSISTANCE PROGRAM

This application is based on Japanese Patent Application No. 2012-133290 filed on Jun. 12, 2012, in the Japan Patent Office, the entire content of which is hereby incorporated by reference.

TECHNICAL FIELD

The present invention relates to an object sharing system and a non-transitory computer readable medium storing an object input assistance program. Especially, the present invention relates to an object sharing system which causes a screen of a common terminal to display an object handwritten in a personal terminal, and to a non-transitory computer readable medium storing a program for assisting handwriting of an object in a personal terminal.

BACKGROUND

A lot of portable terminals such as mobile computers and tablet terminals are provided with a touch panel, wherein objects such as characters which have been handwritten on a touch panel can be used as electronic data. For a user handwriting characters on a touch panel, it is difficult to write plural characters of the same size on the touch panel by hand. To solve the problem, there have been proposed various methods to adjust the size of handwritten characters.

For example, JP-A No. H08-007034 discloses the following device for recognizing and inputting handwritten characters. The device is composed of a pen for inputting handwritten characters and a tablet integrally formed with a screen. The device further includes a display unit for displaying plural input frames for recognizing characters when a user writes characters on the tablet with the pen by hand, and displaying handwritten characters inputted in input frames and recognized characters sequentially. The device further includes a coordinates-sensing unit for detecting up/down signal of the pen and further sensing a handwritten character inputted in the input frame, in the form of coordinate data of dots. The device further includes a coordinate-data-storing unit for storing the given coordinate data, and a character-recognition table which have stored various coordinate data and recognized characters in accordance with a predetermined format with being accompanied with each other in advance. The device further includes a character-recognizing unit for converting the inputted coordinate data into a corresponding reorganized character by referring the character-recognition table and outputting the result onto the screen, and a frame-control unit for, when a user inputs handwritten characters with the pen and tablet, arranging plural input frames on the screen along the same row or column to that of the recognized characters, where each of the frames is formed in the size greater than that of the recognized characters to be outputted. After the character-recognizing unit converts a handwritten character corresponding to one input frame into a recognized character, the frame-control unit deletes the input frame corresponding to the recognized character and further consecutively displays another input frame next to an exisiting input frame, which has already been displayed, to be in the same size.

As another example, JP-A No. 2001-357355 discloses a technology of a device for recognizing handwritten characters, wherein an input frames is not provided for each character. In view of the fact that the character recognition rate can be raised by previously-known information of the size of characters to be inputted, even in the device, the device is configured to prompt a user to input handwritten object with displaying a frame which indicates the size of handwritten characters at a predetermined position on its screen dynamically. This technology reduces the difference of inputted characters in size without disturbing natural handwriting and enhances the character recognition rate.

In recent years, electric meetings are getting popular. Electronic meetings are held in a way that personal terminals used by respective users and a common terminal commonly used by plural users are linked together, objects such as characters, figures and pictures handwritten in the personal terminals are displayed on the screen of the common terminal, and users proceed a meeting with viewing the screen. When objects handwritten in the personal terminals are different in size among the personal terminals, various sizes of objects can be displayed on the screen of the common terminal, which affects an effective proceedings of the meeting.

In view of the background, a technology to display objects of a proper size in the common terminal has been required. However, the above-described conventional arts show technologies regarding to just an object-handwriting device itself and do not show a technology regarding to a system composed of a personal terminal or personal terminals used by each user and a common terminal. Therefore, even if the size of characters can be adjusted in one personal terminal, plural objects which are handwritten in each personal terminal and are displayed on the screen of the common terminal are hard to be adjusted with each other, which causes a problem that the relationship of plural objects displayed on the screen of the common terminal becomes difficult to be understood and a proper proceedings of the meeting with viewing the screen of the common terminal becomes difficult.

SUMMARY

There are disclosed an illustrative object sharing system and a non-transitory computer readable medium storing an object input assistance program, for displaying an object handwritten in a personal terminal onto a screen of the common terminal in a proper size.

An illustrative object sharing system reflecting one aspect of the present invention is an object sharing system comprising: a common terminal; and a personal terminal communicatively coupled with the common terminal through a communication network. The common terminal comprises a common screen for displaying an object handwritten in the personal terminal thereon, and a control section configured to define a reference size of an object based on objects managed by the common terminal, and to transmit the reference size to the personal terminal. The personal terminal comprises a personal screen including a touch panel, and a control section. The control section of the person terminal is configured to perform a process of defining a size of a guide based on the reference size received from the common terminal, where the guide is used as an indicator for displaying an object of the reference size on the common screen, and of displaying the guide of the defined size on the personal screen. The control section of the person terminal is configured to further perform a process of calculating a display size of a handwritten object on the common screen, and transmitting the handwritten object and the display size to the common terminal, where the handwritten object has been handwritten on the personal screen under the condition that the personal screen displays the guide. The control section of the common terminal is further configured to make the common screen display the handwritten object of the display size.

An illustrative non-transitory computer readable medium reflecting one aspect of the present invention is an non-transitory computer readable medium storing an object input assistance program to be executed in a personal terminal. The persona terminal is used in a system wherein a common terminal including a common screen and the personal terminal including a personal screen equipped with a touch panel are communicatively connected to each other through a communication network. The program causes the personal terminal to perform the processes of: a first process of acquiring a reference size of an object from the common terminal, of defining a size of a guide based on the reference size, and of displaying the guide of the defined size on the personal screen, where the reference size is defined based on objects managed by the common terminal, and the guide is used as an indicator for displaying an object of the reference size on the common screen. The program further causes the personal terminal to perform the processes of: a second process of calculating a display size of a handwritten object on the common screen, and of transmitting the handwritten object and the display size to the common terminal, where the handwritten object has been handwritten on the personal screen under the condition that the personal screen displays the guide.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which:

FIG. 4 shows an illustrative table which held by the common terminal relating to an example of the present invention;

FIG. 5 shows an illustrative table which held by the remote tool relating to an example of the present invention;

FIG. 6 is a schematic chart illustrating basic operations (operations to display a handwritten object) of the object sharing system relating to an example of the present invention;

Figure 8:
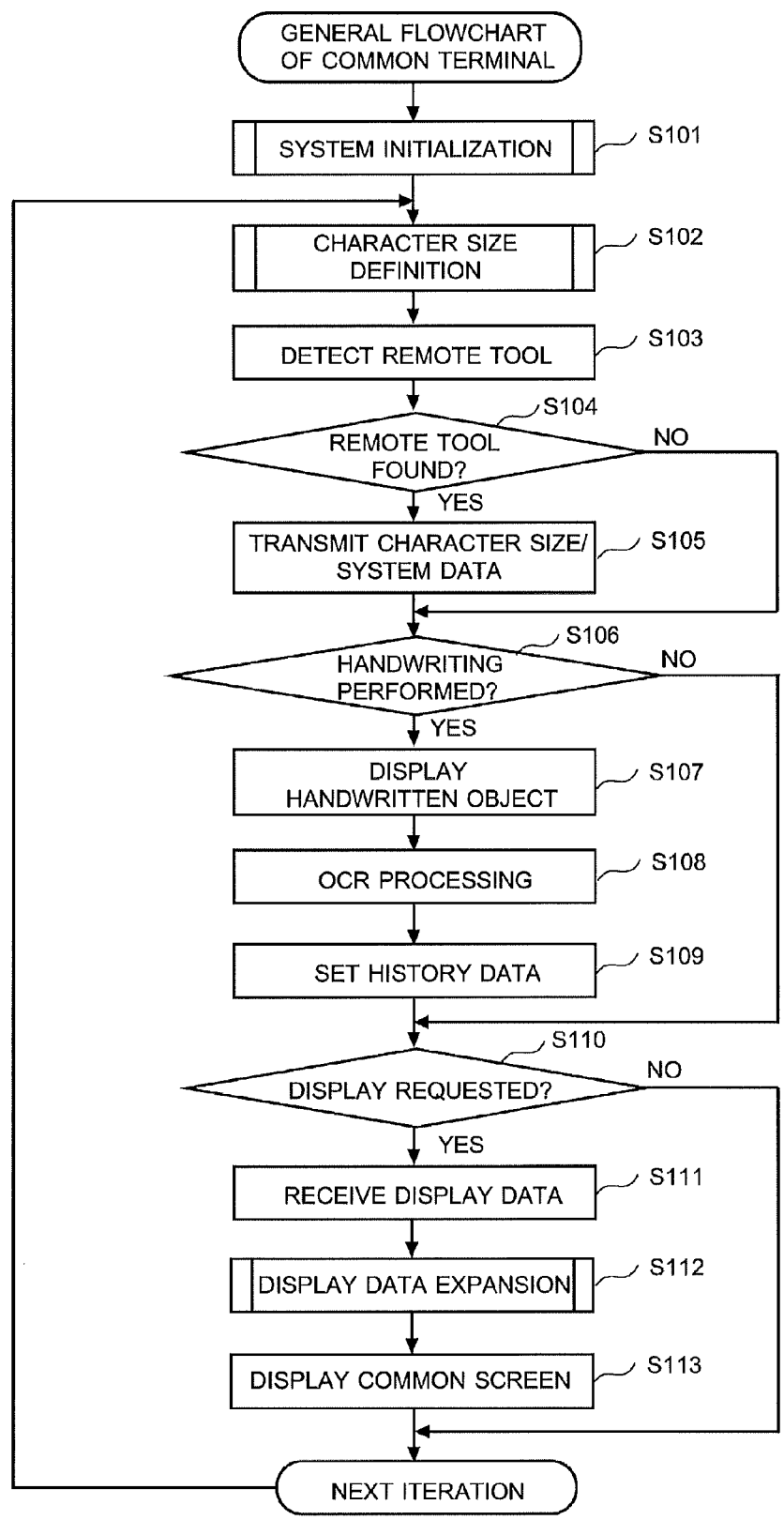
Figure 9:
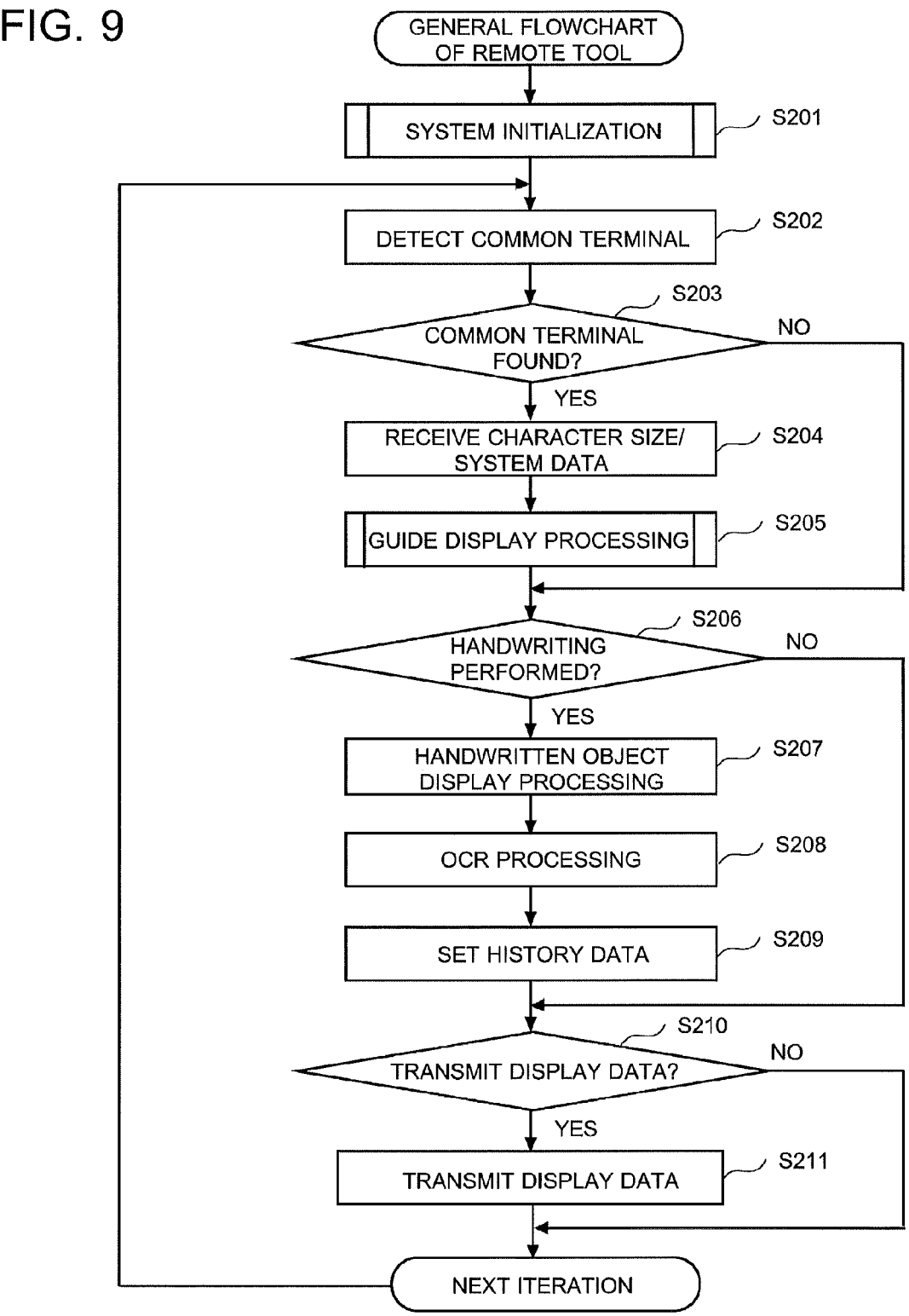
Figure 10:
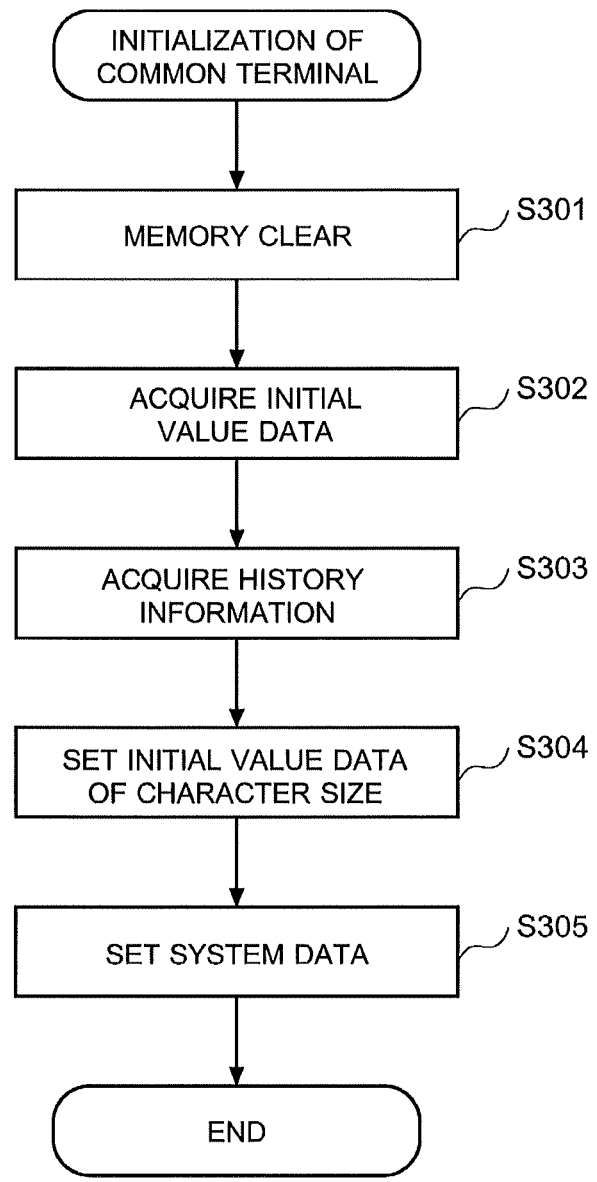
Figure 11:
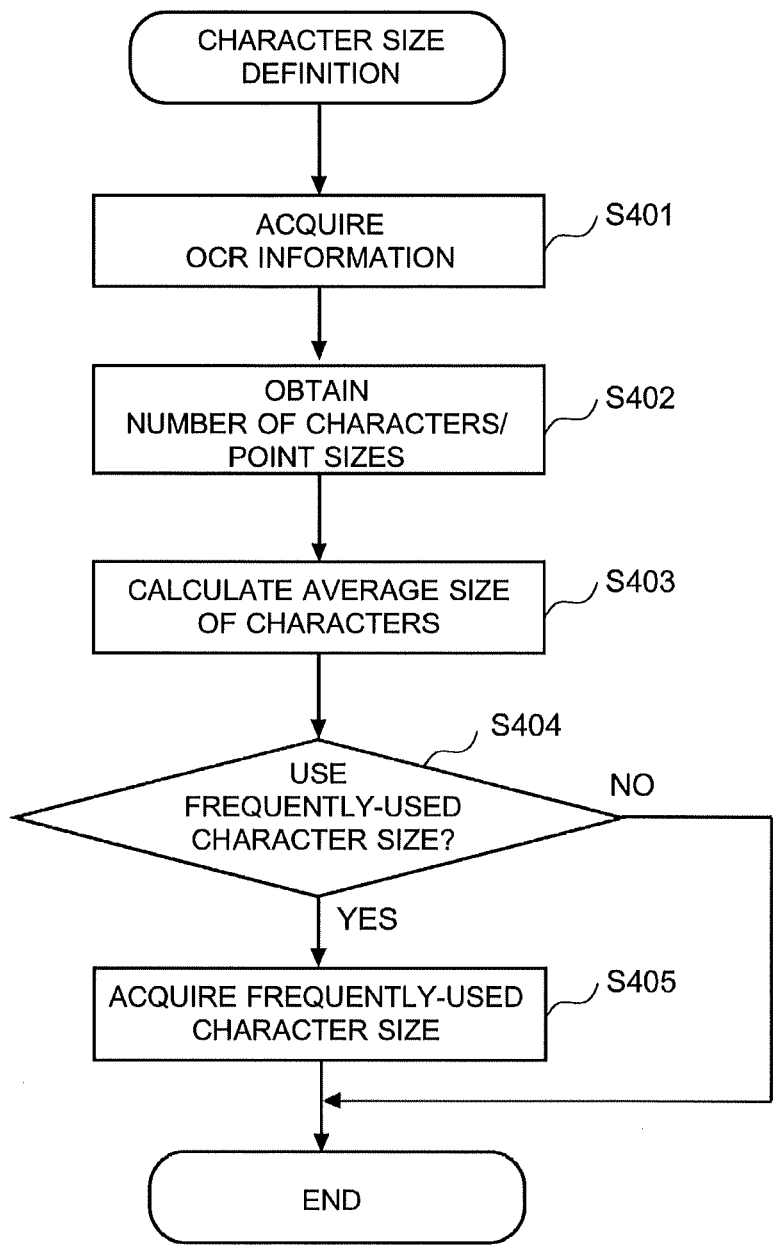
Figure 12:
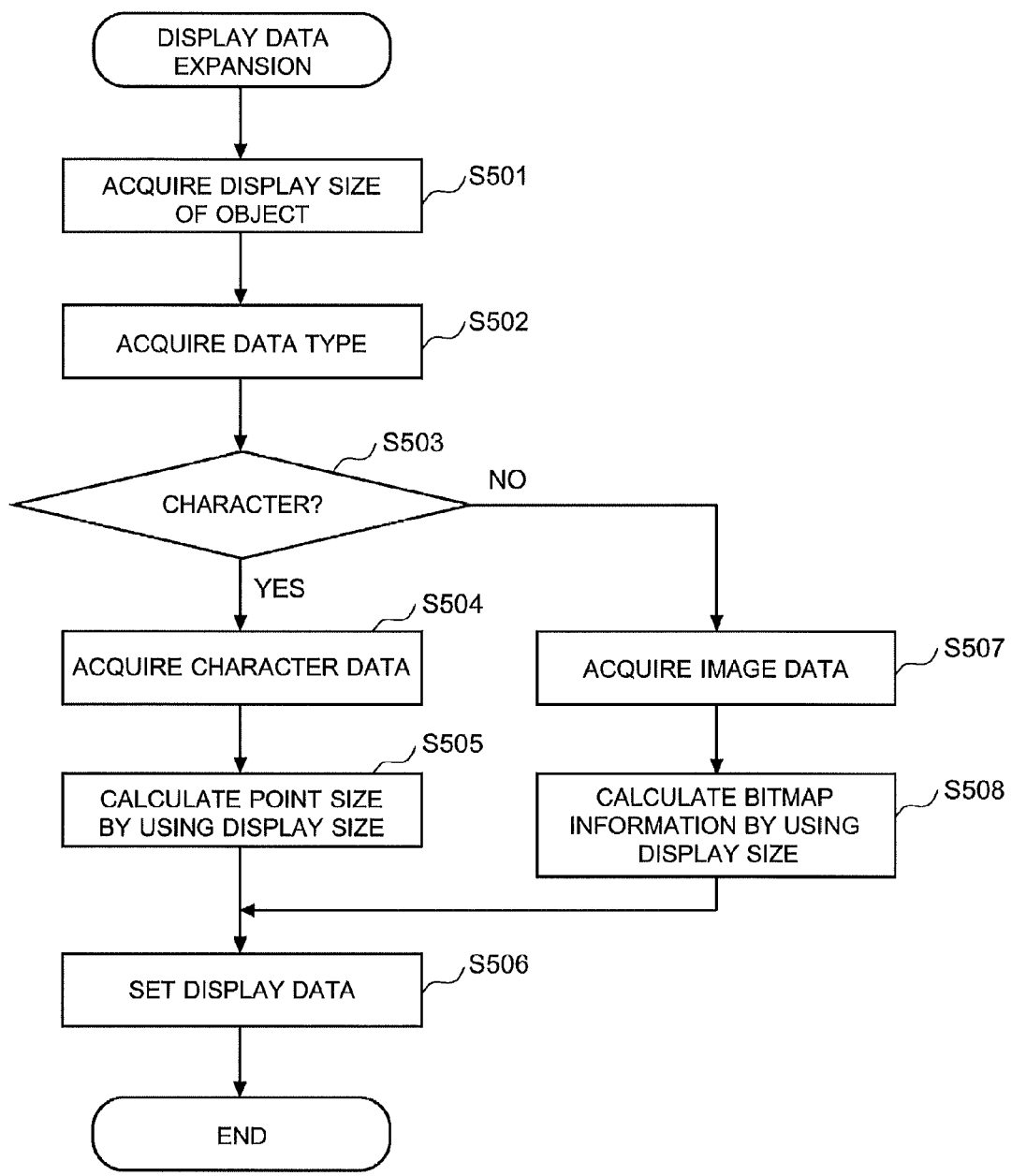
Figure 13:
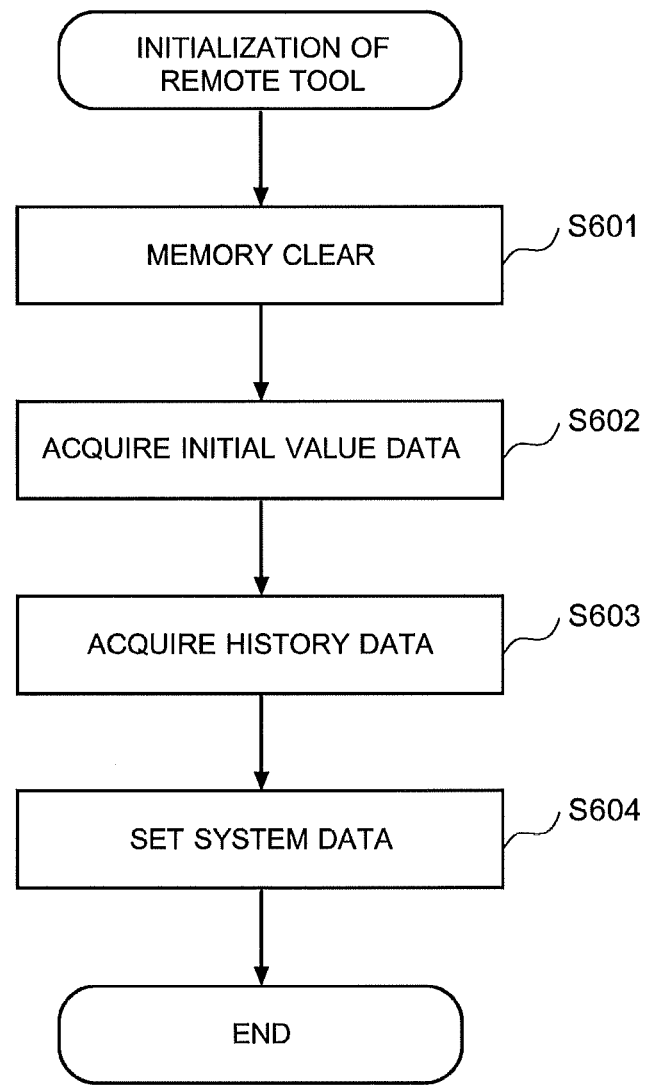
Figure 14:
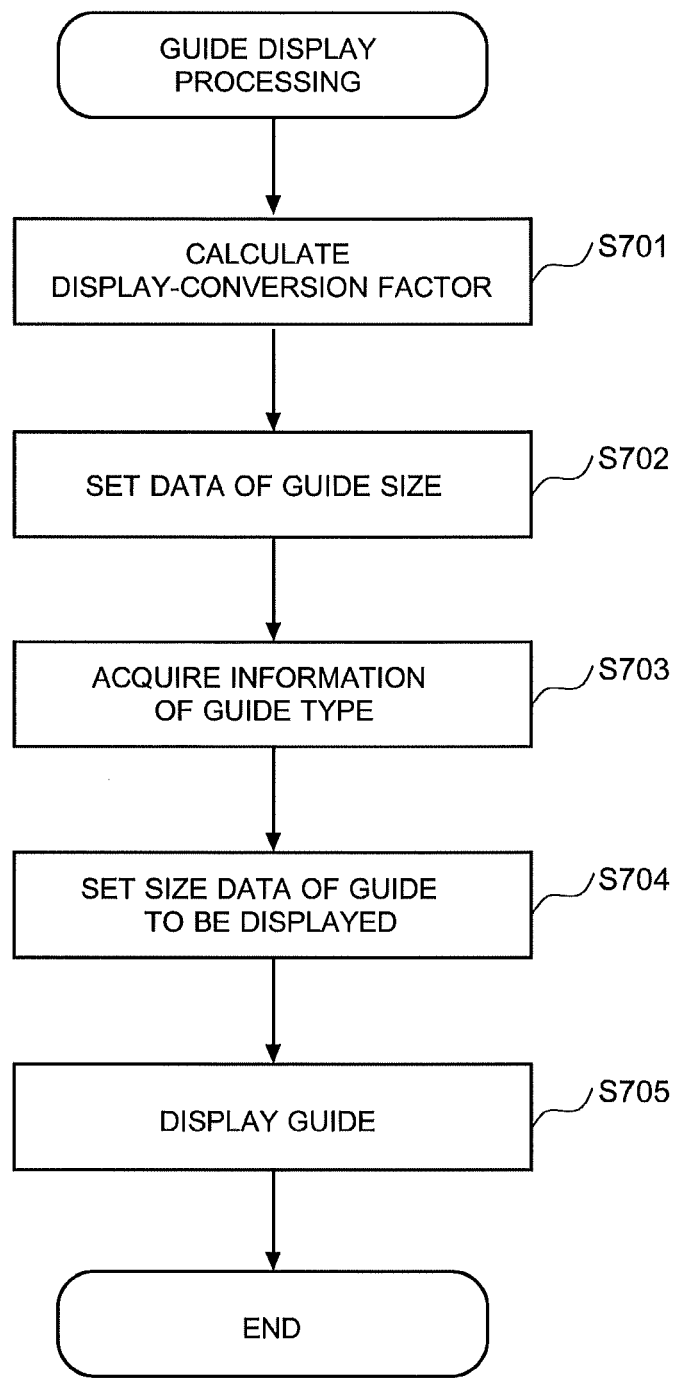
Figure 15:
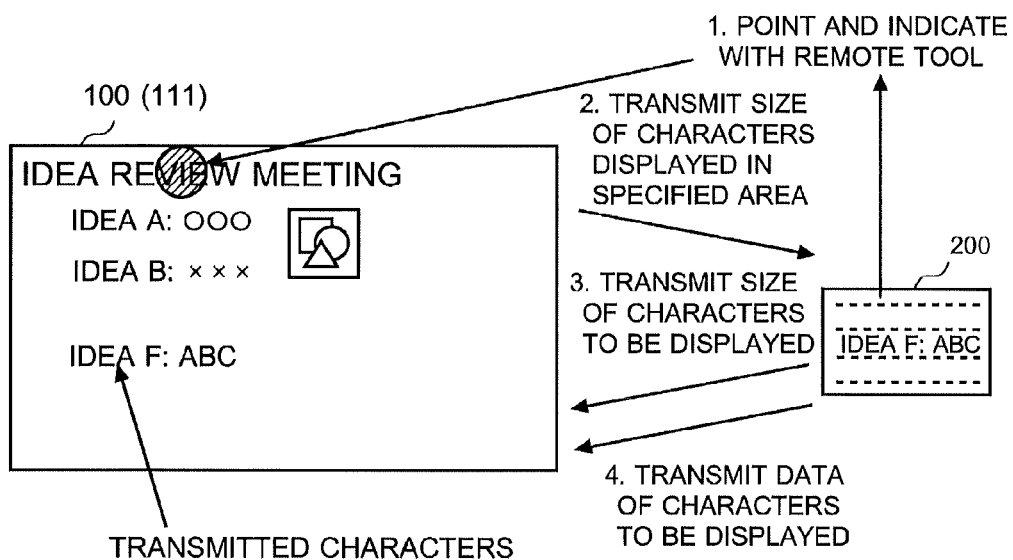
Figure 16:
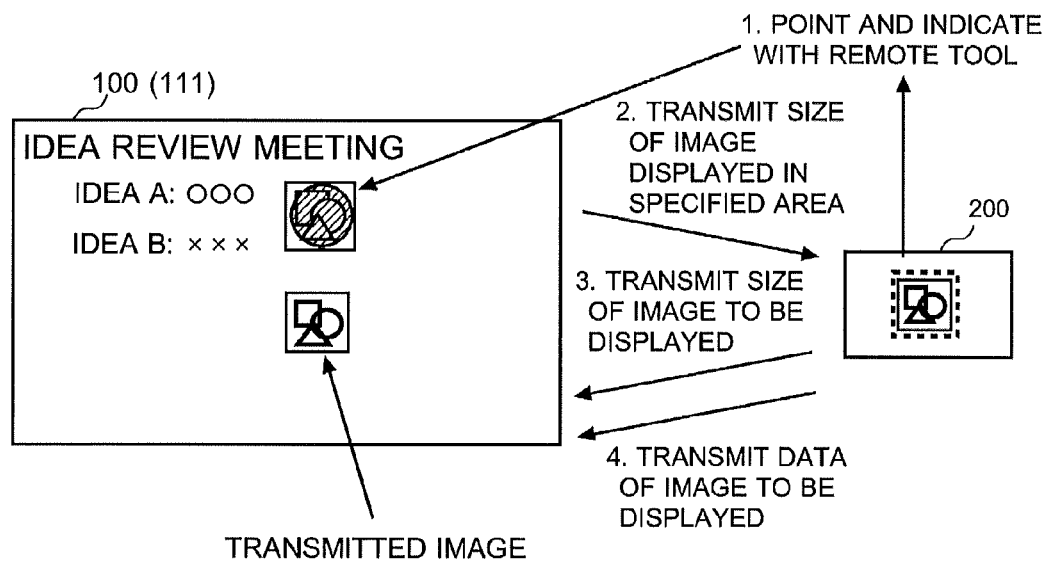
Figure 17:
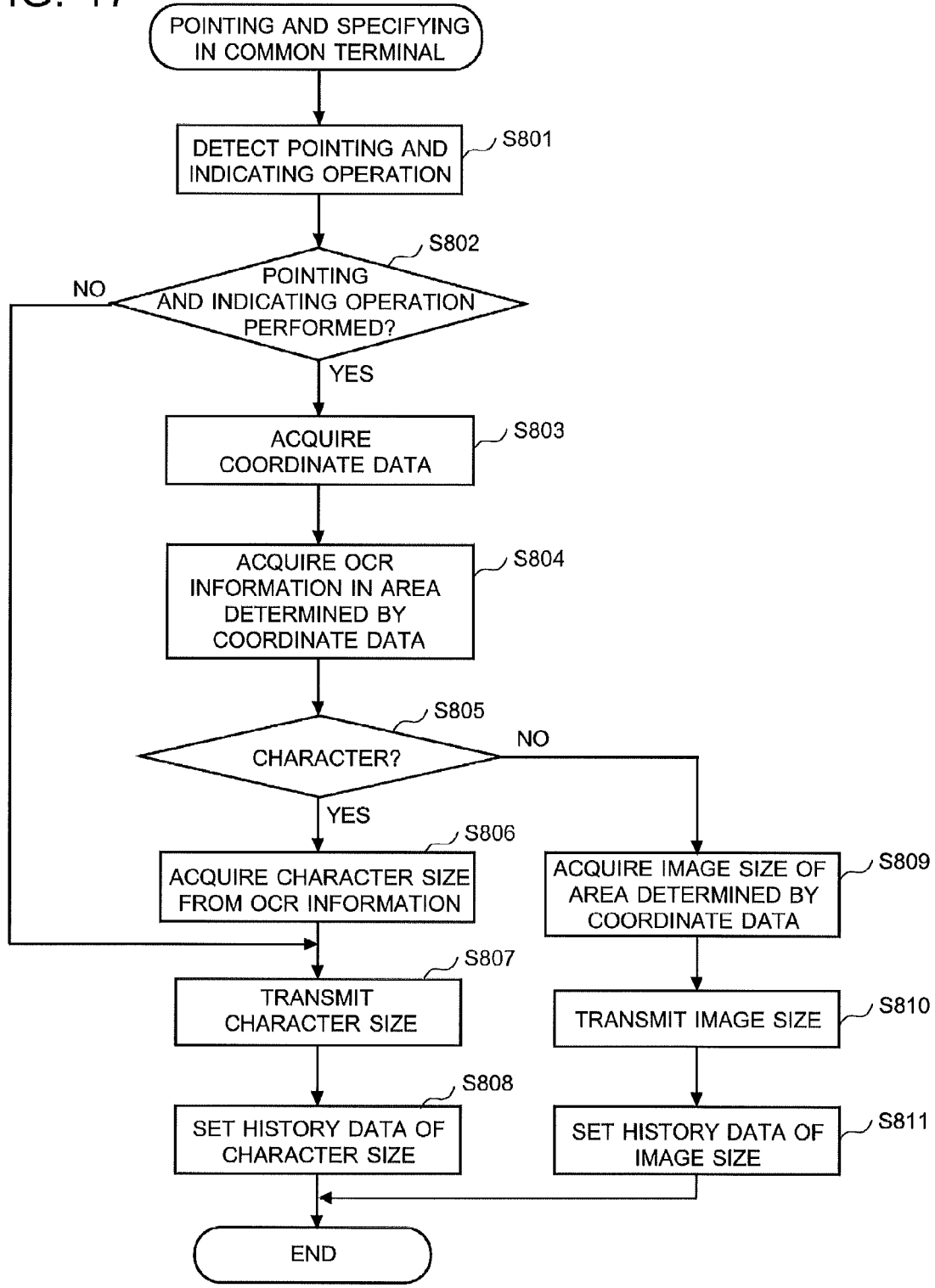

Each of FIGS. 7A to 7D is a diagram showing an embodiment of a guide displayed in the remote tool relating to an example of the present invention;

FIG. 8 is a flowchart illustrating overall operations of the common terminal relating to an example of the present invention;

FIG. 9 is a flowchart illustrating overall operations of the remote tool relating to an example of the present invention;

FIG. 10 is a flowchart illustrating initialization of the common terminal relating to an example of the present invention;

FIG. 11 is a flowchart illustrating definition of the character size in the common terminal relating to an example of the present invention;

FIG. 12 is a flowchart illustrating expansion of display data in the common terminal relating to an example of the present invention;

FIG. 13 is a flowchart illustrating initialization of the remote tool relating to an example of the present invention;

FIG. 14 is a flowchart illustrating guide display processing in the remote tool relating to an example of the present invention;

FIG. 15 is a flowchart illustrating operations (for displaying handwritten characters to be fit with the reference size coming from a specified area) of an object sharing system relating to an example of the present invention;

FIG. 16 is a flowchart illustrating operations (for displaying a handwritten image to be fit with the reference size coming from the specified area) of an object sharing system relating to an example of the present invention; and FIG. 17 is a flowchart illustrating operations of pointing and specifying in the common terminal relating to an example of the present invention.

DETAILED DESCRIPTION

Illustrative embodiments of object sharing systems and non-transitory computer readable media each storing an object input assistance program will be described with reference to the drawings. It will be appreciated by those of ordinary skill in the art that the description given herein with respect to those figures is for exemplary purposes only and is not intended in any way to limit the scope of potential embodiments may be resolved by referring to the appended claims.

According to an illustrative objective sharing system and a non-transitory computer readable medium storing an object input assistance program as embodiments of the present invention, an object handwritten in a personal terminal can be displayed on a screen of the common terminal in a proper size because of the following structures.

The common terminal is configured to define a reference size of objects managed by the common terminal itself and to transmit the reference size to a personal terminal. The personal terminal is configured to define a size of a guide, for example, by calculating a display-conversion factor based on system data of the common terminal and system data of the personal terminal to define the size of the guide based on the reference size and the display-conversion factor, and is configured to display the guide of the given size on its screen. The personal terminal is further configured to, when a user handwrites an object on a personal terminal with referring to the guide, calculate a display size for the common terminal, for example, based on the size of the handwritten object and the display-conversion factor, and to transmit the handwritten object and the display size to the common terminal. Further, the common terminal is further configured to display the handwritten object of the given display size on the common screen.

As described in the above description about the background, the following electronic meetings are becoming popular in recent years. Electronic meetings are held in a way that personal terminals used by respective users and a common terminal commonly used by plural users are linked together, objects such as characters, figures and pictures handwritten in the personal terminals are displayed on the screen of the common terminal, and users proceed a meeting with viewing the screen. Users can handwrite objects in various sizes in respective personal terminals and plural objects displayed on the screen of the common terminal are not uniform in size. This situation makes a relationship of the plural objects unclear and affects effective proceedings of the meeting, which has been a problem. With respect to the problem, there have been proposed methods that objects are adjusted in size in each personal terminal. However, these methods do not properly adjust the size of plural objects which are handwritten in personal terminals.

An illustrative embodiment of the present invention provides an object sharing system wherein an object handwritten in a personal terminal can be transmitted to a common terminal and can be displayed on a screen of the common terminal. The object sharing system makes the personal terminal display a guide such as ruled lines so that a user can perform handwriting in the personal terminal on the basis of the size of objects displayed on the screen of the common terminal.

As a concrete example, in the process of transmitting an object handwritten in a personal terminal to a common terminal and displaying the object on a screen of a common terminal, displaying the transmitted object on the screen as it is can result in an unexpectedly-large size of the displayed object or sometimes in an unexpectedly-small size of the displayed object on the screen. Therefore, it is convenient for users if users can preciously know what size of an object such as characters, figures and pictures inputted in a personal terminal is displayed in what size on the screen of the common terminal. Therefore, the common terminal transmits information, such as an average or frequently-used size of objects managed by the common terminal itself and a size of the object displayed in a user-specified area, as a reference size to a personal terminal. The personal terminal defines the size of a guide based on the reference size and a display-conversion factor calculated by system data of the common terminal and system data of the personal terminal, and displays a guide such as ruled lines in the given size on its screen. When a user inputs a handwritten object in the personal terminal with referring to the displayed guide, the personal terminal calculates a display size of the object for the common terminal based on the size of the handwritten object and the display-conversion factor, and transmits data of the object and the display size of the object to the common terminal. Then, the common terminal displays the object of the given display size on its screen.

Displaying the guide such as ruled lines as the above realizes an easy comparison between the object displayed on the screen of the common terminal and the object to be handwritten in the personal terminal in size. When a user handwrites an object to be same in size as an object displayed in the screen of the common terminal or handwrites an object of an intentionally large or small size in comparison with an object on the screen of the common terminal, and transmits such the handwritten object to the common terminal in the system, the common terminal can display the object of the size desired by the user on its screen. Further, when a user specifies a certain area in the screen of the common terminal by using the personal terminal, the system can change the guide size in accordance with the size of the object displayed in the area, which allows the system to display an object of the desired size on the screen of the common terminal.

EXAMPLE 1

Figure 1:
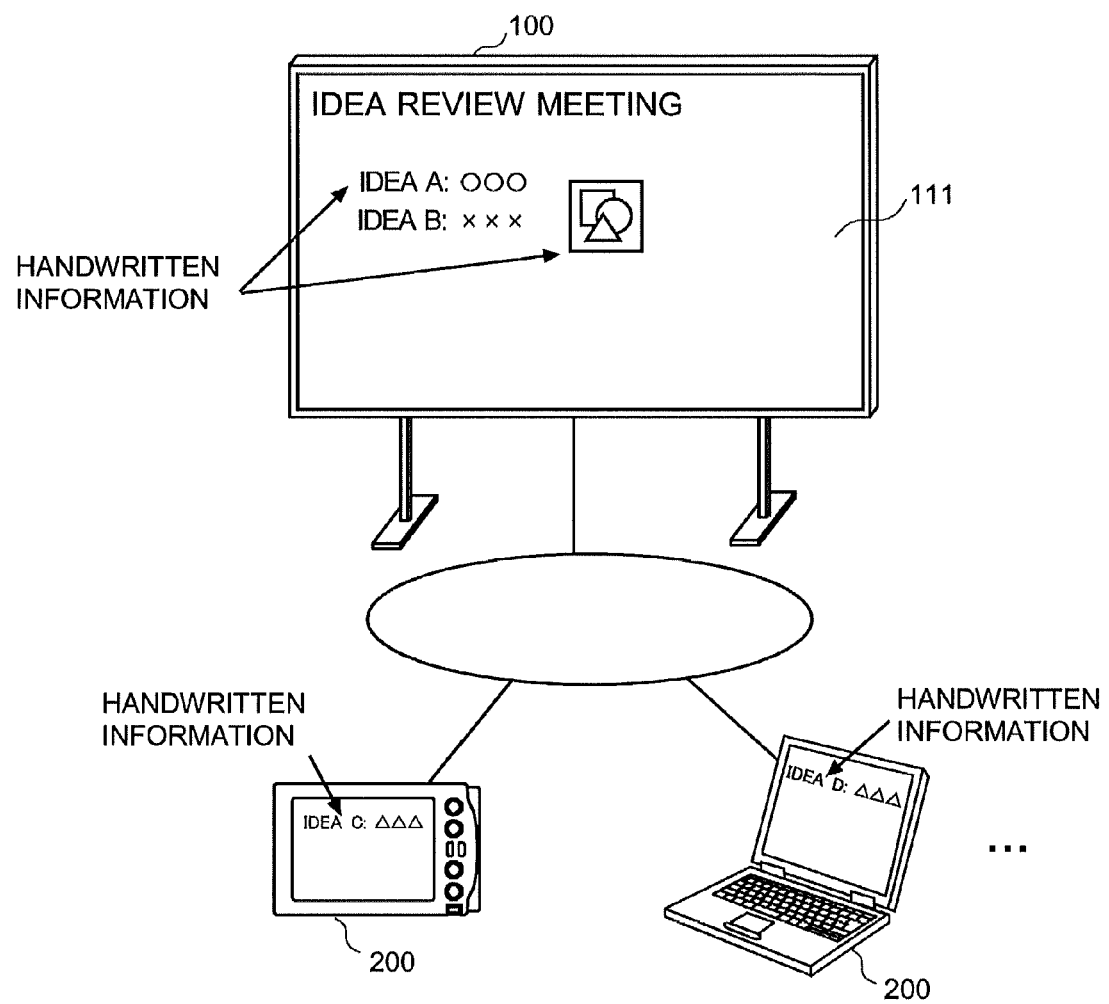
FIG. 1 is a schematic diagram illustrating a structure of an object sharing system relating to an example of the present invention.
Figure 2:
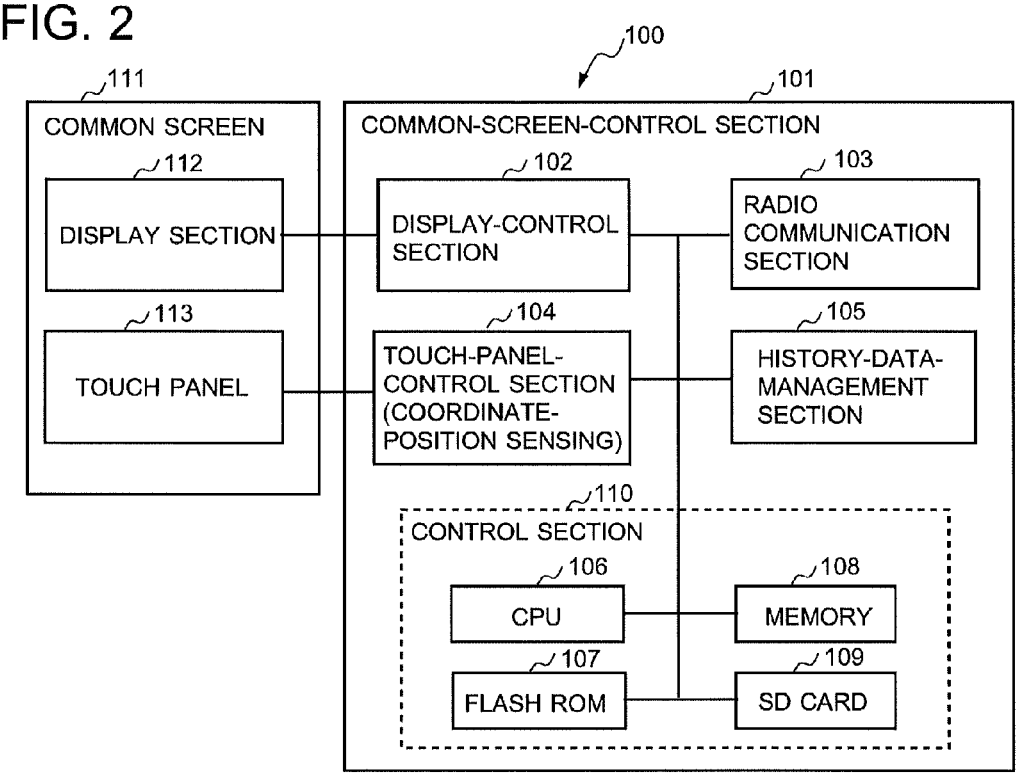
FIG. 2 is a block diagram illustrating a structure of a common terminal relating to an example of the present invention.
Figure 3:
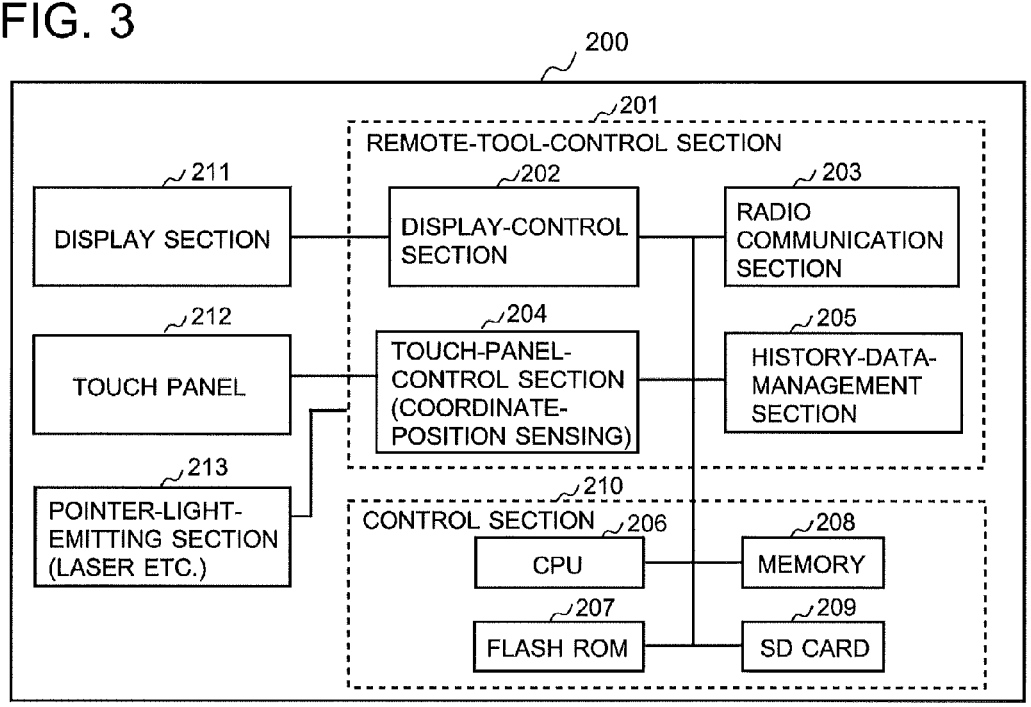
FIG. 3 is a block diagram illustrating a structure of a remote tool relating to an example of the present invention.

For further details of the above embodiment, an illustrative object sharing system and a non-transitory computer readable medium storing an object input assistance program as embodiments of the present invention will be described with reference to FIGS. 1 to 17. FIG. 1 is a schematic diagram illustrating a structure of an object sharing system of the present example. FIG. 2 is a block diagram illustrating a structure of a common terminal. FIG. 3 is a block diagram illustrating a structure of a remote tool. FIGS. 4 and 5 show illustrative tables held by the common terminal and the remote tool, respectively. FIG. 6 is a schematic diagram illustrating operations of the common terminal of the present example. Each of FIGS. 7A to 7D is a diagram showing an embodiment of a guide displayed in the remote tool of the present example. Each of FIGS. 8, 10 to 13 is a flowchart illustrating operations of the common terminal of the present example. Each of FIGS. 9, 13, 14 is a flowchart illustrating operations of the remote tool of the present example. Each of FIGS. 15 and 16 is a flowchart illustrating other operations of an object sharing system of the present example. FIG. 17 is a flowchart illustrating other operations of the common terminal of the present example.

As shown in FIG. 1, an illustrative object sharing system of the present example is composed of common terminal 100 commonly used by plural users and a personal terminal or personal terminals (referred as remote tool 200 in the present example) each used by a user, which are communicatively connected with each other through a communication network such as a LAN (Local Area Network) and WAN (Wide Area Network). Hereinafter, those terminals will be described in detail.

Common Terminal:

As shown in FIG. 2, common terminal 100 of the present example is provided as a display or a projector each provided with a data processing function. Common terminal 100 is composed of common-screen-control section 101 and common screen 111.

Common-screen-control section 101 is composed of components including display-control section 102, radio communication section 103, touch-panel-control section 104, history-data-management section 105 and control section 110. Display-control section 102 controls display section 112 to display characters, figures and pictures (hereinafter, which are referred as an object as a general name) handwritten on touch panel 113, based on coordinate positions acquired from touch-panel-control section 104. Display-control section 102 further controls display section 112 to display an object handwritten in remote tool 200 based on data of the object and size information acquired from remote tool 200 through radio communication section 103. Radio communication section 103 is composed of components including a NIC (Network Interface Card) and a modem, and is provided for forwarding object data and transmitting and receiving size information of an object, from/to remote tool 200. Touch-panel-control section 104 is provided for sensing a coordinate position on touch panel 113 where is touched by a stylus pen or a finger of a user. History-data-management section 105 is provided for managing information relating to objects which has been displayed in common screen 111 as histories.

Control section 110 is composed of components including CPU (Central Processing Unit) 106, Flash ROM (Read Only Memory) 107 for storing programs therein, memory 108 for storing information including data for various controls, and a recording medium such as SD (Secure Digital) card 109 for storing reusable data. Control section 110 is configured to refer size information of objects acquired from history-data-management section 105 to define the average size or frequently-used size of the objects. Control section 110 is further configured to perform a control to transmit the size information (referred as a reference size) to remote tool 200. Control section 110 is further configured to perform OCR (Optical Character Reader) processing for an object displayed on display section 112 to acquire information relating to the object and to transmit the information to history-data-management section 105. SD card 109 stores a table, for example, shown in FIG. 4. As an example, the following data are written in the illustrative table: size information of objects managed by common terminal 100 (size data), data indicating properties (such as the number of characters, point sizes, the number of images and image sizes) of objects (such as used-character data and used-image data), system data (such as a resolution and screen size), data of an object displayed on common screen 111 (display data), size information of an object to be transmitted to remote tool 200 (size data for transmission), scale factor data of an object received from remote tool 200 (received size data) and information of an area specified by remote tool 200 (pointed-coordinate data). These data items are raised for an example and a part of them or other items can be written in the table.

Common screen 111 is composed of components including display section 112 and touch panel 113. Display section 112 is composed of a component such as a LCD (Liquid Crystal Display) and an organic EL display and is provided for displaying objects thereon. Touch panel 113 is formed of lattice-shaped transparent electrodes arranged on display section 112, and is provided for outputting signal corresponding to a position touched with a stylus pen or a finger of a user. As a method of sensing coordinate positions in touch panel 113, various methods using types of capacity, analog/digital resistive film, infrared ray, supersonic ray, and electromagnetic induction, and a combination of those types can be used. When a user specifies an area on the touch panel by pointing with remote tool 200, the common terminal can detect laser light emitted from remote tool 200 by using an infrared-type coordinate detecting method.

Remote Tool:

As shown in FIG. 3, a device such as a mobile computer, tablet terminal, PDA (Personal Digital Assistant) and smart phone is provided as remote tool 200. Remote tool 200 is composed of components including remote-tool-control section 201, control section 210, display section 211, touch panel 212 and pointer-light-emitting section 213.

Remote-tool-control section 201 is composed of components including display-control section 202, radio communication section 203, touch-panel-control section 204 and history-data-management section 205. Display-control section 202 controls display section 211 to display an object handwritten on touch panel 212 based on coordinate positions acquired from touch-panel-control section 204. Display-control section 202 further controls display section 211 to display the whole or a part of an object handwritten in common terminal 100 based on data of the object acquired from common terminal 100 through radio communication section 203, and to display a guide as an indicator to be used by users in handwriting an object, by using guide information transmitted from control section 210. Radio communication section 203 is composed of components including a NIC (Network Interface Card) and a modem, and is provided for forwarding object data and transmitting and receiving size information of an object, from/to common terminal 100. Touch-panel-control section 204 is provided for sensing a coordinate position on touch panel 212 where is touched by a stylus pen or a finger of a user. History-data-management section 205 is provided for managing information relating to objects which has been handwritten in remote tool 200 as histories.

Control section 210 is composed of components including CPU 206, Flash ROM 207 for storing programs therein, memory 208 for storing information including data for various controls, and a recording medium such as SD card 209 for storing reusable data. Control section 210 is configured to calculate a display-conversion factor, which will be described later, by using system data of common terminal 100 and system data of remote tool 200. Control section 210 is further configured to perform a control to define a size of a guide (the size such that an object handwritten to be in the same size to the guide can be displayed on common screen 111 of common terminal 100 in the same size to the reference size) based on the size information of an object (reference size) acquired from common terminal 100 and the given display-conversion factor, and to transmit the guide size to the display-control section 202. Control section 210 is further configured to perform OCR (Optical Character Reader) processing for an object displayed on display section 211 to acquire information relating to the object and to transmit the information to history-data-management section 205. Control section 210 is further configured to calculate the size for displaying an object on common screen 111 (display size) based on the size of the handwritten object and the display-conversion factor, and to transmit the data of the object and the display size to common terminal 100. SD card 209 stores a table, for example, shown in FIG. 5. As an example, the following data are written in the illustrative table: size information of an object received from common terminal 100 (received size data), information of the scale factor of an object to be transmitted to common terminal 100 (size data for transmission), size information of a guide to be displayed on display section 211 (character guide size and image guide size), history information of guides which have been displayed in remote tool 200 (history data), data of an object displayed on display section 211 (display data), and system data (resolution and screen size). These data items are raised for an example and a part of them or other items can be written in the table.

Display section 211 is composed of a component such as LCD (Liquid Crystal Display) and an organic EL display and is provided for displaying an object and a guide thereon as a personal screen used by an individual user. Touch panel 212 is formed of lattice-shaped transparent electrodes arranged on display section 211, and is provided for outputting signal corresponding to a position touched with a stylus pen or a finger of a user. As a method of sensing coordinate positions in touch panel 212, various methods using types of capacity, analog/digital resistive film, infrared ray, supersonic ray, and electromagnetic induction, and a combination of those types can be used. Pointer-light-emitting section 213 emits light (such as laser light) which has high directivity and can be detected by touch panel 113 of common terminal 100, in order to specify a certain area on common screen 111.

Next, operations of the object sharing system having the above structure will be described with reference to the schematic diagram of FIG. 6. It is assumed that characters of a first size ("IDEA REVIEW MEETING"), characters of a second size ("IDEA A: OOO" and "IDEA B: XXX") and an image (figures composed of a square, circle and triangle) have been displayed on common screen 111 of common terminal 100, where the second size is smaller than the first size.

First, control section 110 of common terminal 100 acquires the size of objects (characters in this case) displayed on display section 112 by using OCR processing and determines the average size or frequently-used size of the objects (the second size in this case). In case that display section 112 displays no object, control section 110 determines the average size or frequently-used size of objects which was displayed on the display section 112 in past. Control section 110 transmits the size information (reference size) and its system data to remote tool 200 as information for a guide calculation. The size information and the system data can be transmitted, for example, at the moment that an application of remote tool 200 has started (the application comes into a ready condition), and the moment that common terminal 100 has started and detected remote tool 200 being in a ready condition.

Second, control section 210 of remote tool 200 receives the size information and the system data from common terminal 100, and then calculates a display-conversion factor based on the system data of common terminal 100 and the system data of remote tool 200 to define the size of a guide based on the size information and the display-conversion factor. Display-control section 202 controls display section 211 to display a guide according to the guide size transmitted from control section 210. This guide is enough to be in a shape such that a user of remote tool 200 can use the guide as a reference for handwriting an object in remote tool 200. For example, as shown in FIGS. 7A to 7D, a pattern of ruled lines, a pattern of an area, a pattern of rectangular guide and a pattern of grid can be used. FIG. 7A shows an embodiment of the pattern of ruled lines used mainly for characters, wherein ruled lines are used for indicating the size of an object. FIG. 7B shows an embodiment of the pattern of an area used mainly for images, wherein a frame having a geometric shape such as a rectangular is used for indicating the size of an object. FIG. 7C shows an embodiment of the pattern of a rectangular guide used mainly for characters, wherein a rectangular is displayed in an empty area. FIG. 7D shows an embodiment of the pattern of grid used for both of characters and images, wherein a grid which is common with that of common terminal 100 is displayed.

After a user handwrites an object to be displayed on common screen 111 on touch panel 212, with referring to the guide, control section 210 of remote tool 200 calculates size information of the object to be displayed on common screen 111 (display size) based on the size of the handwritten object and the display-conversion factor, and transmits the information to common terminal 100. The size information can be transmitted, for example, at the moment that the user has performed an action to transmit the object handwritten in the remote tool 200 to common terminal 100 (such as the moment that a user has pressed a transmission switch, the moment that a user has touched the handwritten object by finger and flicks the finger toward the outside of touch panel 212, in other words, has performed a gesture to throw the object away, and the moment that remote tool 200 has been arranged close to common terminal 100). In accordance with the action, common terminal 100 determines that remote tool 200 has issued a display request.

Third, control section 210 of remote tool 200 transmits data of the handwritten object (for example, character codes confirming to ASCII, JIS and codepages supported by Windows (registered trademark) in the case of characters) to common terminal 100. Similarly to the above, the data of the object can be transmitted, for example, at the moment that the user has performed an action to transmit the object handwritten in the remote tool 200 to common terminal 100 (such as the moment that the user has pressed a transmission switch, the moment that the user touches the handwritten object by finger and flicks the finger toward the outside of touch panel 212, in other words, has performed a gesture to throw the object away, and the moment that remote tool 200 has been arranged close to common terminal 100).

Then, receiving the data of handwritten object and the size information from remote tool 200, control section 101 of common terminal 100 controls common display 111 to display the handwritten object of the size defined based on the size information.

In the present example, there has been provided a structure that remote tool 200 is configured to calculate the display size of an object to be displayed on common screen 111 and transmit it to common terminal 100. However, there can be provided another structure, for example, that remote tool 200 is configured to calculate the display-conversion factor and transmit it to common terminal 100 and common terminal 100 is configured to calculate the display size relating to common terminal 100 based on the display-conversion factor. Alternatively, there can be provided the structure, for example, that remote tool 200 is configured to transmit the size information of an object displayed on display section 211 of remote tool 200 and the system data of remote tool 200 to common terminal 100 and common terminal 100 is configured to calculate the display size relating to common terminal 100 based on the size information, the system data of remote tool 200 and the system data of common terminal 100.

Next, operations of the object sharing system will be described in detail. First, operations of common terminal 100 will be described with reference to FIGS. 8, 10 to 13.

As shown in FIG. 8, control section 110 of common terminal 100 performs system initialization (S101). Concretely, as shown in FIG. 10, control section 110 clears up memory 108 (S301) and acquires various types of initial value data and history data from SD card 109 (S302 and S303). Next, control section 110 sets initial value data of character size and system data such as resolution and screen data of common screen 111 to memory 108 (S304 and S305).

Next, control section 110 of common terminal 100 performs definition of character size (S102). Concretely, as shown in FIG. 11, control section 110 collects OCR information such as characters recognized by OCR processing and point size of each character from data managed by the common terminal (S401), and obtains the number of characters and point size of each character (S402). Control section 110 further calculates the average character size based on the number of characters and point sizes of the characters and defines the size as a reference size (S403). Next, control section 110 judges whether there is a setting to use a frequently-used size of characters. When the setting exists (YES of S404), control section 110 acquires the frequently-used size of characters and defines the size as a reference size (S405). In case that there are objects as images such as figures, control section 110 may determine the area of each image, and then may calculate the average size of the images or acquire the frequently-used size of the images.

Next, control section 110 of common terminal 100 detects remote tool 200 connected to a network (S103). When remote tool 200 is found (YES of S104), control section 110 transmits the character size (reference size) defined in S102 and system data such as the resolution and display size stored in SD card 109 to the detected remote tool 200 (S105). In case that remote tool 200 holds the system data of common terminal 100, control section 110 may transmit only the character size (reference size).

Next, control section 110 of common terminal 100 judges whether handwriting has been performed on common screen 111 or not. When handwriting has been performed (YES of S106), display-control section 102 controls display section 112 to display the handwritten object (S107). Then, control section 110 performs OCR processing of the handwritten object (S108), and history-data-management section 105 stores information such as the type and point size of characters, and the image size as history data (S109).

Next, control section 110 of common terminal 100 judges whether remote tool 200 has issued a display request. When a display request is found (YES of S110), control section 110 receives display data (display size of the object to be displayed on common screen 111 and data of the object) from remote tool 200 (S111), and performs expansion of the display data (S112). Concretely, as shown in FIG. 12, control section 110 acquires the display size of the object to be displayed on common screen 111 (S501), and acquires the data type indicating whether the object to be displayed is determined as character or image (S502). When the data type is determined as character (YES of S503), control section 110 acquires the character data (S504) and calculates the point size by using the display size (S505), to generate display data. On the other hand, when the data type is determined as image (NO of S503), control section 110 acquires the image data (S507) and calculates bitmap information of the image by using the display size (S508), to generate display data. After that, control section 110 stores the generated display data into SD card 109 (S506).

Next, display-control section 102 of common terminal 100 reads the generated display data from SD card 109 and causes common screen 111 to display the display data (S113), and returns to S102 to repeatedly perform the similar operations.

Next, operations of remote tool 200 will be described with reference to FIGS. 9, 13 and 14.

Control section 210 of remote tool 200 performs system initialization (S201). Concretely, as shown in FIG. 13, control section 210 clears up memory 208 (S601) and acquires various types of initial value data and history data from SD card 209 (S602 and S603). Next, control section 210 sets system data such as the resolution and screen data of remote tool 200 to memory 208 (S604).

Next, control section 210 of remote tool 200 detects common terminal 100 communicatively connected to a network (S202). When common terminal 100 is found (YES of S203), control section 210 receives the character size (reference size) and system data of common terminal 100 from common terminal 100 (S204). In the case that the control section 210 has already held (acquired in past) the system data of common terminal 100, control section 210 may receive only the character size (reference size).

Next, control section 210 of remote tool 200 performs guide display processing (S205). Concretely, as shown in FIG. 14, control section 210 calculates a display-conversion factor (for example, the ratio of the screen size of display section 211 to the screen size of common screen 111) by using the system data of remote tool 200 and the system data of common terminal 100 (S701). Next, control section 210 defines the size of a guide based on information of the character size (reference size) and the display-conversion factor (for example, by multiplying the reference size and the ratio of screen size together and optionally by further multiplying a predetermined factor with the multiplication result) and sets the data of the guide size to SD card 209 (S702). Next, control section 210 acquires information about the type of a guide to be displayed (S703), and sets the data of the guide to be displayed to SD card 209 (S704). Then, display control section 202 reads the guide data and the guide size data from SD card 209, and controls display section 211 to display the guide (S705).

The present invention provides the example that the guide size is defined based on the reference size and the display-conversion factor. However, in case that the screen size of display section 211 is extremely smaller than the screen size of common screen 111, the guide size sometimes becomes so small that users hardly input a handwritten object. In such the case, the control section may acquire the size information such as the average size and the frequently-used size of characters which has been written in the remote tool (in other words, a standard size of handwritten characters for the remote tool), based on the history data stored in history-data-management section 205, and display a guide of the resulting size. At that time, control section 210 of remote 200 may calculate the display-conversion factor based on the reference size and the system data of common terminal 100 and on the standard handwriting size and the system data of remote tool 200 (for example, by multiplying the standard handwriting size of the remote tool 200 and the screen size of remote tool 200 together and dividing the result by the value obtained by multiplying the reference size and the screen size of common screen 111 together).

Next, control section 210 of remote tool 200 judges whether handwriting has been performed in remote tool 200 or not. When handwriting has been performed (YES of S206), display-control section 202 causes display section 211 to display the handwritten object (S207). Then, control section 210 performs OCR processing of the handwritten object (S208), and history-data-management section 205 stores given information such as the type and point size of characters, and the image size as history data (S209).

Next, control section 210 of remote tool 200 judges whether there is an operation to transmit display data performed by a user. When an operation to transmit display data is found (YES of S210), control section 210 calculates the display size of an object to be displayed on common display 111 based on the size of the handwritten object and the display-conversion factor (for example, by dividing the size of the object by the screen size ratio and optionally by further dividing the result by the predetermined factor) and transmits the given display data (data of the display size and object) to common terminal 100 (S211). After that, control section 210 returns to S202 to repeatedly perform the similar operations.

As described above, remote tool 200 defines the size of a guide based on the reference size of common terminal 100 and displays the guide. When a handwritten object is inputted, remote tool 200 calculates the display size of the object for common terminal 100 based on the size of handwritten object and the display-conversion factor and transmits the data of the object and the display size for common terminal 100 to common terminal 100. Then, common terminal 100 displays the received object of the received display size. Therefore, such the system allows common screen 111 to display an object of a desired size.

The above flow has been described under the assumption that the display scale factor of common screen 111 does not change. However, the reference size is enlarged or reduced corresponding to the change of the display scale factor of common screen 111. If a guide displayed in remote tool 200 is enlarged or reduced corresponding to the enlargement or reduction of the reference size after the guide has been displayed in remote tool 200, it can affect user's handwriting in the remote tool. Therefore, the control section of the remote tool may be configured to keep the guide size even under the condition that the display scale factor of common screen 111 is changed after displaying the guide in remote tool 200. In this case, the control section of the remote tool may adjust the display size to be transmitted to common screen 111 corresponding to the degree of the change of the display scale factor of common screen 111. For example, under the condition that the display scale factor of common screen 111 has been changed to twice but the guide size in remote tool 200 has not been changed, an object handwritten by using the guide as reference results in a half of the reference size on common screen 111. Therefore, the system may adjust the display size to be transmitted to common screen 111 to be twice so that the object can be displayed in the reference size on common screen 111.

Further, the above flow has been described under the assumption that the display scale factor of remote tool 200 does not change, too. However, if only the handwritten object is enlarged or reduced corresponding to the change of display scale factor of remote tool 200 after a guide is displayed in remote tool 200, it can affect a comparison of the guide and the object in size. Therefore, under the condition that the display scale factor of remote tool 200 is changed after the guide has been displayed on remote tool 200, the system may control the guide to be enlarged or reduced according to the display scale factor.

Further, the above flow shows an example of a control between one common terminal 100 and one remote tool 200. In case that plural remote tools 200 are communicatively connected to the common terminal 100, the system may control each remote tool 200 to display a guide in the same size. Further, when the guide size is changed in one of remote tools 200, the system may control the other remote tools 200 to change the guide size similarly.

In the above description, the example that the average size or frequently-used size of objects managed in common terminal 100 is used as the reference size has been described. However, users may desire to display a handwritten object in the same size to that of an object displayed in a certain area of common screen 111. In such the case, a user may specify a certain area of common screen 111 with remote tool 200 to use the size of an object displayed in the area as the reference size.

Hereinafter, operations of the object sharing system under the condition that the size of a character displayed in the specified area is used as the reference size, will be described with reference to the schematic diagram of FIG. 15. In this example, it is assumed that characters of a first size ("IDEA REVIEW MEETING"), characters a of second size ("IDEA A: OOO" and "IDEA B: XXX") and an image (figures composed of a square, circle and triangle) have been displayed on common screen 111 of common terminal 100, similarly to FIG. 6, where the second size is smaller than the first size.

First, a user points and indicates a certain area by irradiating the area where the characters of desired size (herein, the characters of "IDEA REVIEW MEETING") are displayed on common screen 111, with pointer-light-emitting section 213 of remote tool 200. Touch-panel-control section 102 determines the irradiated area based on signal outputted from touch panel 113.

Second, control section 110 of common terminal 100 acquires the indicated area from touch-panel-control section 102, and determines the size of characters (the first size in this case) displayed in the area or the vicinity as the specified area. Then, control section 110 transmits the size information (the determined character size) as information for guide calculation to remote tool 200.

Third, control section 210 of remote tool 200 receives the size information (the determined character size), and then calculates a display-conversion factor based on the system data of common terminal 100 and the system data of remote tool 200 to define a guide size based on the size information and the display-conversion factor. Display control section 202 causes display section 211 to display a guide according to the guide size transmitted from control section 210. When a user handwrites an object to be displayed on common screen 111 on touch panel 212, with referring to the guide, control section 210 of remote tool 200 calculates size information (display size) of the object to be displayed on common screen 111 based on the size of the handwritten object and the display-conversion factor, and transmits the information to common terminal 100.

Fourth, control section 210 of remote tool 200 transmits data of the handwritten object (for example, character codes confirming to ASCII, JIS and codepages supported by Windows (registered trademark) in the case of characters) to common terminal 100.

Then, receiving the data of handwritten object and the size information from remote tool 200, control section 111 of common terminal 100 causes common display 111 to display the handwritten object of the size defined based on the size information.

FIG. 15 shows the example that characters has been specified. Under the condition that an image has been specified, the object sharing system performs operations as shown in FIG. 16.

First, as shown in FIG. 16, a user points and indicates a certain area by irradiating the area where an image of a desired size is displayed on common screen 111, with pointer-light-emitting section 213 of remote tool 200. Touch-panel-control section 102 determines the irradiated area based on signal outputted from touch panel 113.

Second, control section 110 of common terminal 100 acquires the indicated area from touch-panel-control section 102, and determines the size of an image (the first size in this case) displayed in the area or the vicinity as the specified area. Then, control section 110 transmits the size information (the determined image size) as information for guide calculation to remote tool 200.

Third, control section 210 of remote tool 200 receives the size information (the determined image size), and then calculates a display-conversion factor based on the system data of common terminal 100 and the system data of remote tool 200 to define a guide size based on the size information (the determined image size) and the display-conversion factor. Display control section 202 causes display section 211 to display a guide according to the guide size transmitted from control section 210. When a user handwrites an object to be displayed on common screen 111 on touch panel 212, with referring to the guide, control section 210 of remote tool 200 calculates size information (display size) of the object to be displayed on common screen 111 based on the size of the handwritten object and the display-conversion factor, and transmits the information to common terminal 100.

Fourth, control section 210 of remote tool 200 transmits data of the handwritten object (for example, image data such as bitmap data) to common terminal 100.

Then, receiving the data of handwritten object and the size information from remote tool 200, control section 111 of common terminal 100 causes common display 111 to display the handwritten object of the size defined based on the size information.

Hereinafter, operations of common terminal 100 in pointing and indicating an area will be described with reference to the flowchart of FIG. 17.

Touch-panel-control section 104 of common terminal 100 detects a pointing and indicating operation of remote tool 200 by using signal outputted from touch panel 113 (S801). When touch-panel-control section 104 detects the pointing and indicating operation (YES of S802), control section 110 acquires coordinate data of the indicated point (S803) and acquires OCR information by performing OCR processing for the area specified based on the coordinate data (S804).

Next, control section 110 of common terminal 110 judges whether the object displayed around the given coordinates is determined as character or not. In case of character (YES of S805), control section 110 acquires the character size from the OCR information (S806). Then, control section 110 transmits information such as the character size to remote tool 200 (S807), and set history data of the character size to SD card 109 (S808). On the other hand, in case of image (NO of S805), control section 110 acquires the image size determined by the coordinate data (S809). Then, control section 110 transmits the image size to remote tool 200 (S810), and set history data of the image size to SD card 109 (S811).

As described above, when a user specifies the certain area on common screen 111 with remote tool 200, it allows common screen 111 to display a handwritten object in the same size as that of the object displayed in the area or display a handwritten object in intentionally larger or smaller size than that of the object displayed in the area.

While the present example of the present invention have been described using specific terms, such description is for illustrative purpose only, and it is to be understood that changes and variations may be made without depending from the spirit or scope of the appended claims.

For example, in the above examples, the system defines the guide size based on the reference size of common terminal 100 and the display-conversion factor and determines the display size for common terminal 100 based on the size of the object handwritten in remote tool 200 and the display-conversion factor. However, the system may define the guide size based on only the reference size (in other words, to display the guide of the same size to that of the object displayed on common screen 111), which allows easy comparison between the object displayed on common screen 111 and the object to be handwritten on remote tool 200 in size.

In the above example, the system defines the certain area on common screen 111 by using light emitted with remote tool 200. Alternatively, for example, the system may be configured to display a copy of common screen 111 on display section 211 of remote tool 200 and transmit information of a user-specified point to common terminal 100 when a user specifies a point on the copy by using touch panel 212. As another example, the system may be configured to directly specify the point by touching touch panel 113 of common screen 111.

The invention claimed is:

1. An object sharing system comprising:
   a common terminal; and
   a personal terminal communicatively coupled with the common terminal through a communication network,
   the common terminal comprising
      a common screen for displaying an object handwritten in the personal terminal thereon, and
      a control section configured to define a reference size of an object based on objects managed by the common terminal, and to transmit the reference size to the personal terminal,
   the personal terminal comprising
      a personal screen including a touch panel, and
      a control section configured to perform
         a process of defining a size of a guide based on the reference size received from the common terminal, the guide being used as an indicator for displaying an object of the reference size on the common screen, and
            displaying the guide of the defined size on the personal screen, and
         a process of calculating a display size of a handwritten object on the common screen, and
            transmitting the handwritten object and the display size to the common terminal, where the handwritten object has been handwritten on the personal screen under the condition that the personal screen displays the guide,
   wherein the control section of the common terminal is further configured to make the common screen display the handwritten object of the display size.

2. The object sharing system of claim 1,
   wherein the personal terminal further comprises an unit which specifies an area on the common screen, and
   the control section of the common terminal is further configured to
      determine a type of an object displayed in the area,
      determine a character size of the object when the object is determined as character,
      determine an image-area size of the object, when the object is determined as image, and
      transmit one of the character size and the image-area size as the reference size to the personal terminal.

3. The object sharing system of claim 1,
   wherein the control section of the personal terminal is configured to
      calculate a display-conversion factor based on system information of the common terminal and system information of the personal terminal,
      define the size of the guide based on the reference size and the display-conversion factor, and
      calculate the display size based on a size of the handwritten object handwritten on the personal screen and the display-conversion factor.

4. The object sharing system of claim 1,
   wherein the control section of the common terminal is configured to
      determine a frequently-used character size among character sizes of characters displayed on the common screen, and
      transmit the frequently-used character size to the personal terminal as the reference size.

5. The object sharing system of claim 1,
   wherein the common terminal further comprises a storing section which stores history information of character sizes of characters which has been displayed on the common screen, and
   the control section of the common terminal is configured to determine a frequently-used character size based on the history information stored in the storing section and to transmit the frequently-used character size to the personal terminal as the reference size.

6. The object sharing system of claim 5,
   wherein the control section of the common terminal is configured to transmit a predetermined character size to the personal terminal as the reference size, when the storing section stores no history information.

7. The object sharing system of claim 1,
   wherein the control section of the personal terminal is further configured to keep the size of the guide under a condition that the reference size is enlarged or reduced corresponding to a change of a display scale factor of the common screen after the guide has been displayed on the personal screen.

8. The object sharing system of claim 1,
   wherein the control section of the personal terminal is further configured to, under a condition that a display scale factor of the personal screen is changed after the guide has been displayed on the personal screen, enlarge or reduce the size of the guide according to the changed display scale factor.

9. A non-transitory computer readable medium storing an object input assistance program to be executed in a personal terminal for use in a system wherein a common terminal including a common screen and the personal terminal including a personal screen equipped with a touch panel are communicatively connected to each other through a communication network, the program causing the personal terminal to perform the processes of:

a first process of
- acquiring a reference size of an object from the common terminal, the reference size being defined based on objects managed by the common terminal,
- defining a size of a guide based on the reference size, the guide being used as an indicator for displaying an object of the reference size on the common screen, and
- displaying the guide of the defined size on the personal screen, and a second process of
- calculating a display size of a handwritten object on the common screen, and
- transmitting the handwritten object and the display size to the common terminal, where the handwritten object has been handwritten on the personal screen under the condition that the personal screen displays the guide.

10. The non-transitory computer readable medium of claim 9,
wherein the first process further includes calculating a display-conversion factor based on system information of the common terminal and system information of the personal terminal, to determine the size of the guide based on the reference size and the display-conversion factor, and
wherein in the second process, the display size is calculated based on a size of the handwritten object handwritten on the personal screen and the display-conversion factor.

11. The non-transitory computer readable medium of claim 9,
wherein the first process further includes keeping the size of the guide under a condition that the reference size is enlarged or reduced corresponding to a change of a display scale factor of the common screen after the guide has been displayed on the personal screen.

12. The non-transitory computer readable medium of claim 9,
wherein the first process includes, under a condition that a display scale factor of the personal screen is changed after the guide has been displayed on the personal screen, enlarging or reducing the size of the guide according to the changed display scale factor.

* * * * *